United States Patent [19]
Allen

[11] 4,388,698
[45] Jun. 14, 1983

[54] DATA BUFFER CIRCUIT

[75] Inventor: John H. Allen, Orlando, Fla.

[73] Assignee: The United States of America as represented by the Secretary of the Navy, Washington, D.C.

[21] Appl. No.: 276,277

[22] Filed: Jun. 22, 1981

[51] Int. Cl.³ .............................................. G06F 3/00
[52] U.S. Cl. ...................................... 364/900; 365/78
[58] Field of Search .................. 364/200, 900; 365/78

[56] References Cited
U.S. PATENT DOCUMENTS 3,823,393  7/1974  Norris ................................. 364/900
4,047,157  9/1977  Jenkins ............................... 364/200

Primary Examiner—Felix D. Gruber
Assistant Examiner—Tim A. Wiens
Attorney, Agent, or Firm—Robert F. Beers; Robert W. Adams; Robert J. Veal

[57] ABSTRACT

A data buffer circuit is disclosed for receiving from a serial-to-parallel data conversion interface circuit a plurality of sixteen-bit parallel data words, for storing therein for a predetermined time period each of the parallel data words, and for transferring to a computer, so as to allow for processing by the computer, each of the parallel data words.

12 Claims, 3 Drawing Figures

DATA BUFFER CIRCUIT

BACKGROUND OF THE INVENTION

1. Field of the Invention

This invention relates generally to data processing. In particular, this invention relates to a data buffer circuit which provides for the temporary storage of sixteen-bit parallel data words therein.

2. Description of the Prior Art

Heretofore, numerous storage, buffer, and interface circuits have been employed to temporarily store therein digital data which is to be processed by a computer. Such systems are too numerous to discuss herewith. Besides, most thereof constitute prior art devices which are well known to the artisan, thereby obviating the need for further discussion thereof.

Of course, there are several prior art devices which are of some significance, inasmuch as they at least remotely or indirectly concern subject matter that is pertinent to the circuit constituting the instant data buffer.

For example, U.S. Pat. No. 3,764,991 to W. Metzenthen and N. Verhoeckx discloses a device comprising a plurality of series arranged storage elements, including a write circuit connected to an information pulse source for storing a number of information pulses forming a pulse group in said storage elements, and an output circuit, means connecting an information output of a storage element to an information input of the subsequent storage element, and control pulses originating from a control pulse circuit being applied to said storage elements for controlling each storage element so as to shift the binary value 0 or 1 stored therein to an adjacent storage element.

While the aforementioned devices of the prior art are satisfactory for their intended purpose, that of data storage, they ordinarily leave something to be desired, especially from the standpoints of storage capacity, transfer speed, and complexity in design.

In addition, the aforesaid devices of the prior art do not operate in exactly the same manner as the subject invention and present a combination of elements that is somewhat different from that of the present invention.

SUMMARY OF THE INVENTION

The subject invention overcomes some of the disadvantages of the prior art, including those mentioned above, in that it comprises a relatively simple data buffer circuit adapted for temporarily storing therein data which is to be processed by a computer.

Included in the subject invention is a first input terminal adapted for receiving a data ready pulse signal, and a second input terminal adapted for receiving a data acknowledge pulse signal. First gating means, in response to the aforesaid data ready pulse signal, provides first, second, and third latch signals while second gating means, in response to the aforementioned data acknowledge pulse signal, provides first, second, and third select signals. First storage means will, in response to the first latch signal, store therein for a first predetermined time period a first sixteen-bit data word, and then transfer to the output thereof, in response to the first select signal, the aforementioned first sixteen-bit data word. Similarly, second storage means will, in response to the second latch signal, store therein for a second predetermined time period a second sixteen-bit data word, and then transfer to the output thereof, in response to the second select signal, the aforementioned second data word.

In a like manner, third storage means will, in response to the third latch signal, store therein for a third predetermined time period a third sixteen-bit data word, and then transfer to the output thereof, in response to the third select signal, the aforesaid third data word.

DESCRIPTION OF THE PREFERRED EMBODIMENT

Figure 1:
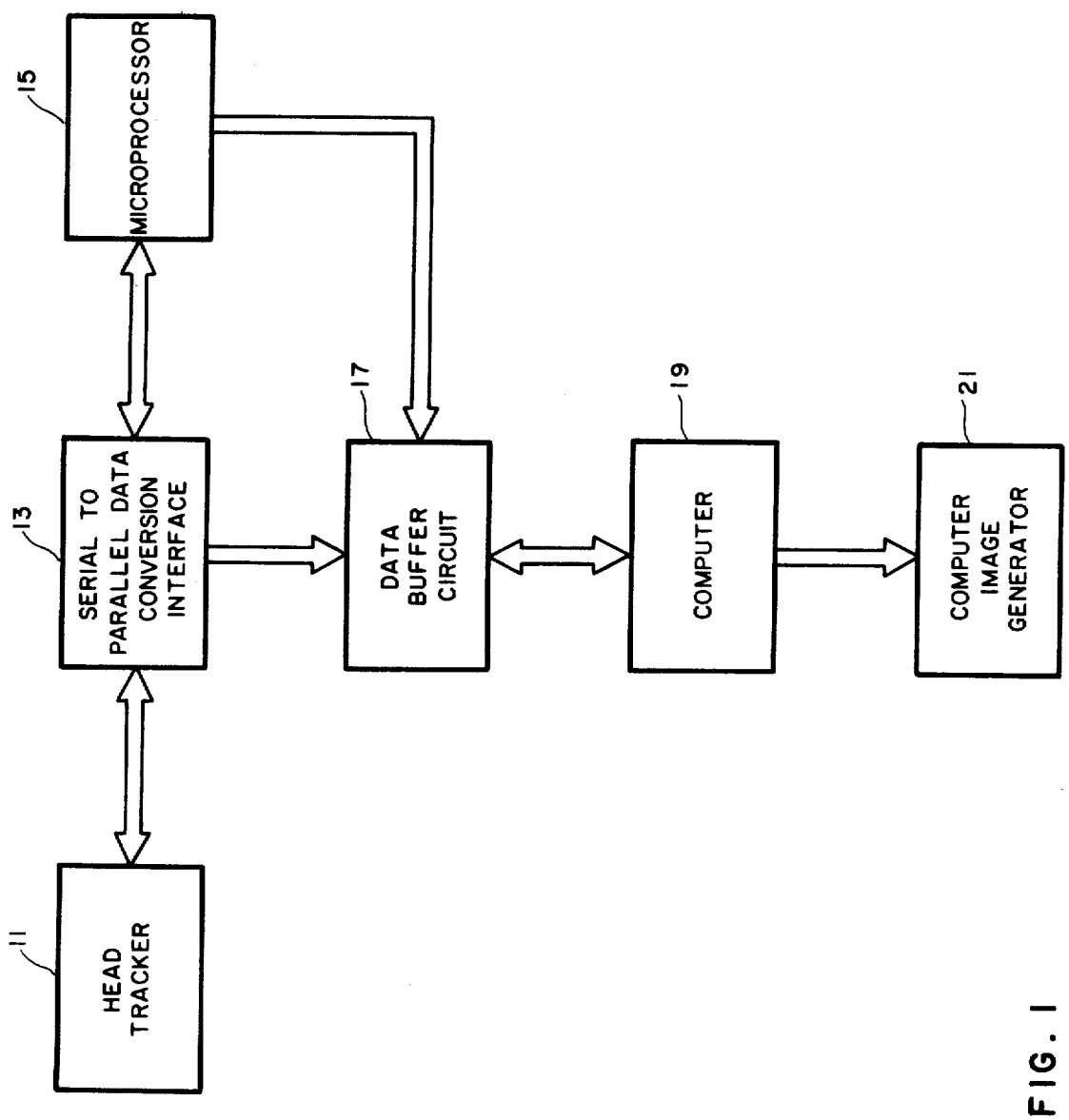
FIG. 1 is a block diagram of a typical situation in which the subject invention may be utilized.

The preferred embodiment of the subject invention will now be discussed in some detail in conjunction with all of the figures of the drawing, wherein like parts are designated by like reference numerals, insofar as it is possible and practical to do so.

Referring now to FIG. 1, there is shown a head tracker 11, the first input-output terminal of which is connected to the first input-output terminal of a serial to parallel data interface conversion circuit 13, with the second input-output terminal thereof connected to the input-output terminal of a microprocessor 15.

The output terminal of serial-to-parallel data conversion interface circuit 13 is connected to the first input terminal of a data buffer circuit 17, while the output terminal of microprocessor 15 is connected to the second input terminal of data buffer circuit 17. The input-output terminal of data buffer circuit 17 is, in turn, connected to the input-output terminal of a computer 19 with the output terminal thereof connected to the input terminal of a computer image generator 21.

At this time, it may be noteworthy to mention that the operation of serial-to-parallel data conversion interface circuit 13 is fully described in U.S. patent application Ser. No. 275,564, entitled Serial-to-Parallel Data Interface Conversion Circuit, by John H. Allen, the inventor of this invention.

Figure 2:
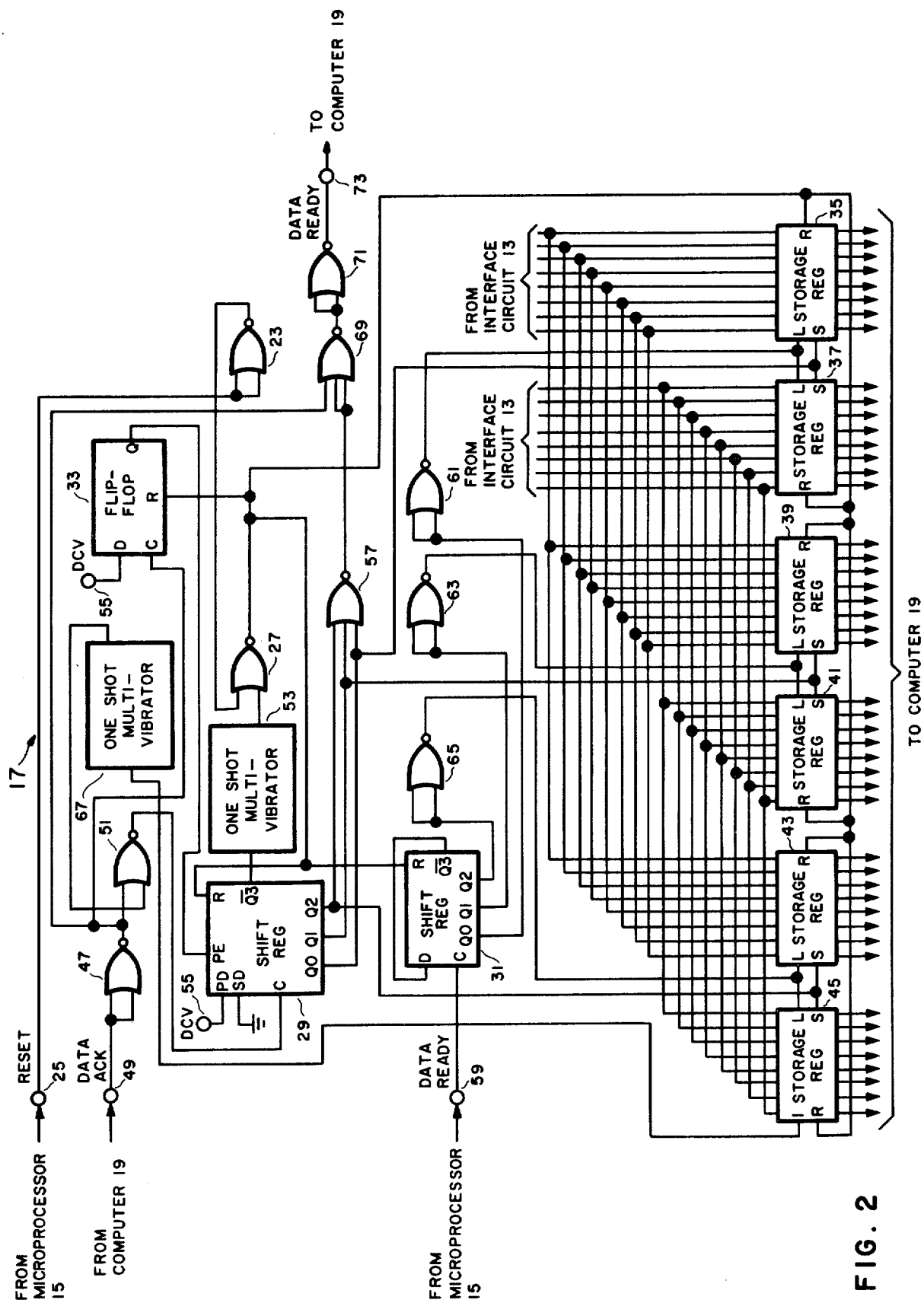
FIG. 2 is an electrical schematic diagram of a data buffer circuit constituting the subject invention.

Referring now to FIGS. 1 and 2, there is shown an electrical schematic diagram of data buffer circuit 17 which constitutes the subject invention. Included in data buffer circuit 17 is a NOR gate 23, the first and second inputs of which are connected through an input terminal 25 to the reset output of microprocessor 15. The output of NOR gate 23, in turn, is connected to the first input of a NOR gate 27, the output of which is connected to the reset input of a shift register 29, the reset input of a shift register 31, the reset input of a flip-flop 33, and the reset inputs of latches 35, 37, 39, 41, 43, and 45.

The first and second inputs of a NOR gate 47 are connected through an input terminal 49 to the data acknowledge output of computer 19. The output of NOR gate 47 is, in turn, connected to the first input of a NOR gate 51, the output of which is connected to the clock input of shift register 29. The Q3 output of shift register 29, in turn, is connected to the input of a one-shot multivibrator 53, the output of which is connected to the second input of NOR gate 27.

The output of a direct current voltage source 55 is connected to the parallel data input of shift register 29 and the data input of flip-flop 33. The Q output of flip-flop 33, in turn, is connected to the parallel entry input of shift register 29, the Q0 output of which is connected to the first input of a NOR gate 57, the Q1 output of which is connected to the second input of NOR gate 57, and the Q2 output of which is connected to the third input of NOR gate 57. In addition, the Q0 output of shift register 29 is connected to the select inputs of storage registers 35 and 37, the Q1 output of shift register 29 is connected to the select inputs of storage registers 39 and 41, and the Q2 output of shift register 29 is connected to the select inputs of storage registers 43 and 45. Further, the serial data input of shift register 29 is connected to a ground.

The clock input of shift register 31 is connected through an input terminal 59 to the data ready output of microprocessor 15. The $\overline{Q3}$ output of shift register 31, in turn, is connected to the data input of shift register 31. The Q0 output of shift register 31 is connected to the first and second inputs of a NOR gate 61, the output of which is connected to the latch inputs of storage registers 35 and 37. The Q1 output of shift register 31, in turn, is connected to the first and second inputs of a NOR gate 63, the output of which is connected to the latch inputs of storage registers 39 and 41. Similarly, the Q2 output of shift register 31 is connected to the first and second inputs of a NOR gate 65, the output of which is connected to the latch inputs of storage registers 43 and 45.

The interrupt output of storage register 45 is connected to the input of a one-shot multivibrator 67, the output of which is connected to the second input of NOR gate 51.

The output of NOR gate 47 is connected to the clock input of flip-flop 33, and the first input of a NOR gate 69, while the second and third inputs of NOR gate 69 are connected to the output of NOR gate 57. The output of NOR gate 69, in turn, is connected to the first and second inputs of a NOR gate 71, the output of which is connected through an output terminal 73 to the data ready input of computer 19.

Interface circuit 13 has sixteen data outputs, eight of which are effectively and respectively connected to the data inputs of storage registers 35, 39, and 43, and eight of which are effectively and respectively connected to the data input storage registers 37, 41 and 45. The data outputs of storage registers 35, 37, 39, 41, 43, and 45 are, in turn, connected to the sixteen-bit data bus of computer 19.

In the exemplary data buffer circuit of FIG. 2 according to the subject invention, components successfully utilized are as follows:

| Component | Component Name | Model No. | Manufacturer |
|---|---|---|---|
| 23, 27, 47, 51, 57, 61, 63, 65, 71 | NOR gate | 7402 | Fairchild |
| 57, 69 | NOR gate | 7427 | Fairchild |
| 53, 67 | Monostable Multivibrator | 96L02 | Fairchild |
| 29, 31 | Shift Register | 74195 | Fairchild |
| 33 | Flip-Flop | 7474 | Fairchild |
| 35, 37, 39, 41, 43, 45 | Latch | 8212 | Intel |

The operation of the subject invention will now be discussed in conjunction with all of the figures of the drawing.

Figure 3:
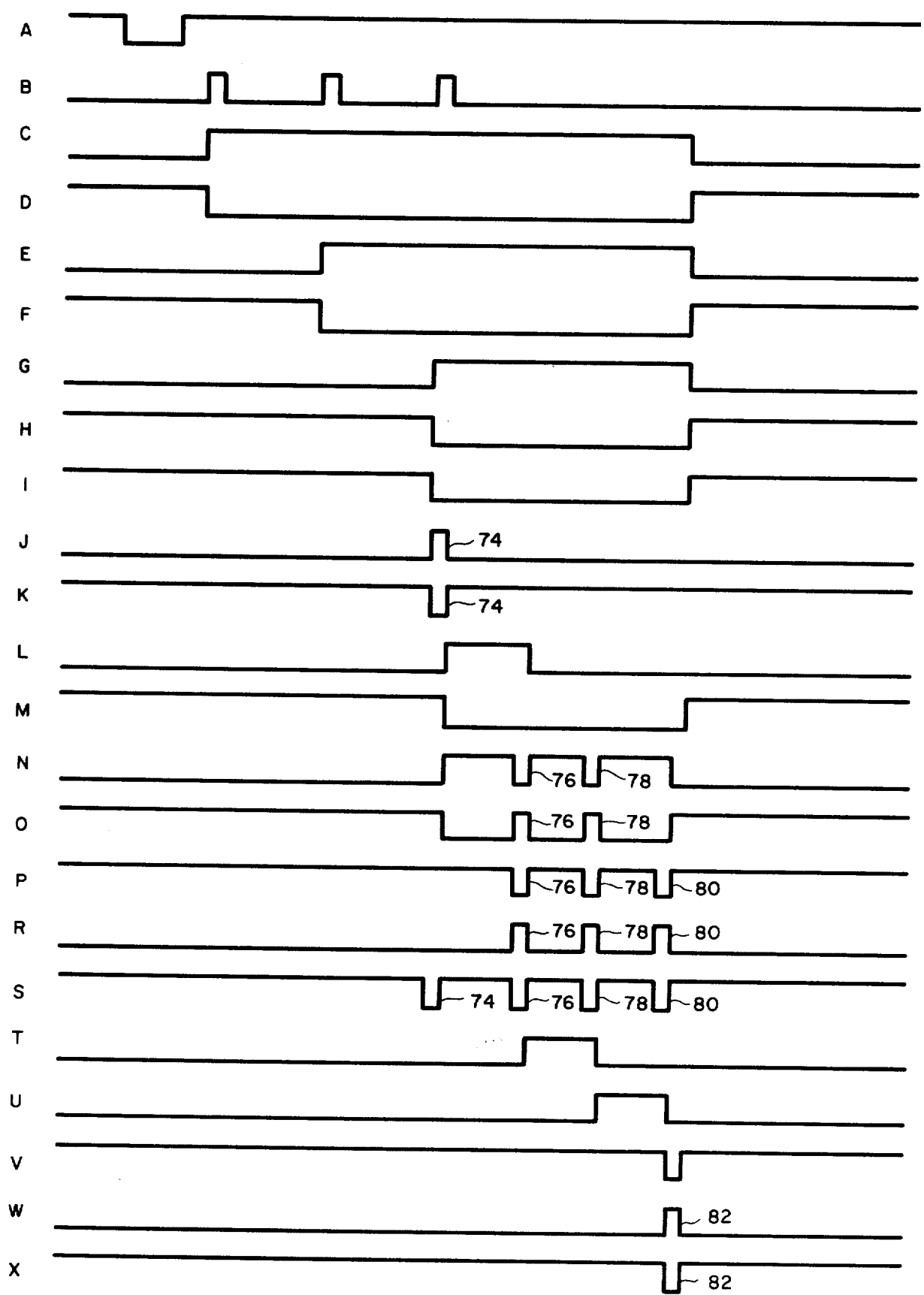
FIG. 3 is an expended graphical representation of various pulse signals which occur at the outputs of some of the elements of FIG. 2.

Referring now to FIGS. 1 and 2, microprocessor 15 initializes data buffer circuit 17 by supplying through NOR gates 23 and 27 to the reset inputs of shift registers 29 and 31, flip-flop 33, and storage registers 35 through 45 a reset pulse signal similar to that depicted in FIG. 3A. The reset pulse signal of FIG. 3A, in turn, clears shift registers 29 and 31 such that the Q0, Q1 and Q2 outputs thereof are in the logic "0" state and the $\overline{Q3}$ output thereof is in the logic "1" state. In addition, the reset pulse signal of FIG. 3A clears storage registers 35 through 45 such that data from interface circuit 13 may be stored therein as will be described more fully below, and initializes flip-flop 33 such that the Q output thereof is in the logic "0" state.

As discussed more fully in U.S. patent application Ser. No. 275,564, head tracker 11 supplies to interface circuit 13 serial data words indicative of the movement of the head of the wearer of head tracker 11 in azimuth, elevation, and roll. The aforementioned serial data words are then converted by interface circuit 13 to a sixteen-bit parallel format so as to allow for the temporary storage thereof in data buffer circuit 17. As will be discussed more fully below, the first of the aforesaid sixteen-bit parallel data words, indicative of azimuthal movement of the head of the wearer of head tracker 11, is temporarily stored by data buffer circuit 17 in storage registers 35 and 37. In a like manner, the second of the aforementioned sixteen-bit parallel data words, indicative of elevation movement of the head of the wearer of head tracker 11 is temporarily stored by data buffer circuit 17 in storage registers 39 and 41. In the same manner, the third of the aforesaid sixteen-bit data words, indicative of roll movement of the head of the wearer of head tracker 11 is temporarily stored by data buffer circuit 17 in storage registers 43 and 45.

When interface circuit 13 has completed conversion of the data words supplied thereto by head tracker 11, in the manner described in U.S. patent application Ser. No. 275,564, microprocessor 15 will supply to the clock input of shift register 31 a data ready pulse signal similar to that depicted in FIG. 3B.

As discussed previously, the $\overline{Q3}$ output of shift register 31 is initially in the logic "1" state, thereby causing a logic "1" to be supplied to the data input of shift register 31. The first pulse of the data ready pulse signal of FIG. 3B will then trigger shift register 31 such that the Q0 output thereof will change from a logic "0" state to a logic "1" state as shown in the signal waveform of FIG. 3C. The signal of FIG. 3C is then inverted by NOR gate 61, as shown by the signal waveform of FIG. 3D, and applied to the latch inputs of storage registers 35 and 37. Application of the signal of FIG. 3D to the latch inputs of storage registers 35 and 37, in turn, will cause storage registers 35 and 37 to latch or store therein the first of the aforementioned sixteen-bit data words, indicative of azimuthal movement of the head of the wearer of head tracker 11.

In a like manner, the second pulse of the data ready pulse signal of FIG. 3B will trigger shift register 31 such that the Q1 output thereof will change from a logic "0" to a logic "1" state as shown in the signal waveform of FIG. 3E. The signal of FIG. 3E is then inverted by NOR gate 63, as shown by the signal waveform of FIG. 3F, and applied to the latch inputs of storage registers 39 and 41. Application of the signal of FIG. 3F to the latch inputs of storage registers 39 and 41, in turn, will cause storage registers 39 and 41 to latch or store therein the aforesaid sixteen-bit data word, indicative of elevation movement of the head of the wearer of head tracker 11.

Likewise, the third pulse of the data ready pulse signal of FIG. 3B will trigger shift register 31 such that the Q2 output thereof will change from a logic "0" state to a logic "1" state as shown in the signal waveform of FIG. 3G. The signal of FIG. 3G is then inverted by NOR gate 65, as shown by the signal waveform of FIG. 3H and applied to the latch inputs of storage registers 43 and 45. Application of the signal of FIG. 3H to the latch inputs of storage registers 43 and 45, in turn, will cause storage registers 43 and 45 to latch or store therein the aforementioned sixteen-bit data word, indicative of roll movement of the head of the wearer of head tracker 11.

Storage register 45 will then provide at the interrupt output thereof an interrupt pulse signal, similar to that shown in FIG. 3I, so as to indicate that data is stored therein. The interrupt signal of FIG. 3I is then supplied to the input of one-shot multivibrator 67 so as to trigger one-shot multivibrator 67 such that one-shot multivibrator 67 will provide at the output thereof a pulse 74 similar to that shown in FIG. 3J. Pulse 74 of FIG. 3J, which has a time period of approximately 600 nanoseconds, is supplied to the second input of NOR gate 51, which inverts and then passes therethrough to the output thereof pulse 74, as shown in the signal waveform of FIG. 3K.

As discussed previously, the Q output of flip-flop 33 is initialized to the logic "0" state by the reset pulse signal of FIG. 3A. This, in turn, will cause a logic "0" to appear at the parallel entry input of shift register 29. When the parallel entry input of shift register 29 has applied thereto a logic "0" and a clock pulse is applied to the clock input of shift register 29, a logic "1" applied to the parallel data input of shift register 29 will be clocked therethrough to the Q0 output thereof. Accordingly, application of pulse 74 of FIG. 3K to the clock input of shift register 29 will cause the Q0 output thereof to change from the logic "0" state to a logic "1" state as shown in the signal waveform of FIG. 3L. The logic "1" provided at the Q0 output of shift register 29 is then supplied to the select inputs of storage registers 35 and 37 so as to activate storage registers 35 and 37, and thereby effect the transfer of the data word stored within registers 35 and 37 to the data outputs of registers 35 and 37. The aforesaid data word stored within registers 35 and 37 is then supplied to computer 19 for processing thereby.

In addition, the signal of FIG. 3L is supplied to NOR gate 57 which inverts the signal of FIG. 3L such that the output of NOR gate 57 will change from a logic "1" state to a logic "0" state as shown in the signal waveform of FIG. 3M.

The signal of FIG. 3M is then supplied to NOR gate 69, which inverts the signal of FIG. 3M such that the output of NOR gate 69 will change from a logic "0" state to a logic "1" state as shown in the signal waveform of FIG. 3N.

The signal of FIG. 3N is, in turn, inverted by NOR gate 71 which provides at the output a data ready pulse signal similar to that depicted in FIG. 3O. The signal of FIG. 3O is, in turn, supplied through output terminal 73 to the data ready input of computer 19 so as to indicate to computer 19 that the sixteen-bit parallel data word stored in registers 35 and 37 is ready for transfer to computer 19. Computer 19, in response to the data ready pulse signal of FIG. 3O, supplies through input terminal 49 to NOR gate 47 a data acknowledge pulse signal similar to that depicted in FIG. 3P. The data acknowledge pulse signal of FIG. 3P, in turn, has therein a series of pulses respectively designated as 76, 78 and 80. The data acknowledge pulse signal of FIG. 3P is then inverted by NOR gate 47 so as to provide at the output thereof a pulse signal waveform similar to that depicted in FIG. 3R.

Pulse 76 of the pulse signal of FIG. 3R is then supplied to the clock input of flip-flop 33. The leading edge of pulse 76 of the pulse signal of FIG. 3R, in turn, triggers flip-flop 33 such that the Q output thereof will change from a logic "0" state to a logic "1" state. The logic "1" from the Q output of flip-flop 33 is supplied to the parallel entry input of shift register 29. Application of a logic "1" to the parallel entry input of shift register 29 inhibits the parallel entry of data such that shift register 29 functions only to shift data from the serial data input, which is grounded to Q0.

In addition, the pulse signal of FIG. 3R is supplied to NOR gate 51, which combines the signal of FIG. 3R with the signal of FIG. 3K, so as to provide at the output thereof a signal similar to that shown in FIG. 3S.

The trailing edge of pulse 76 of the signal of FIG. 3S, when applied to the clock input of shift register 29, triggers shift register 29 such that the Q0 output thereof will change from a logic "1" state to a logic "0" state as shown in FIG. 3L, and the Q1 output thereof will change from a logic "0" state to a logic "1" state as shown in the signal waveform of FIG. 3T. The logic "1" provided at the Q1 output of shift register 29 is supplied to the latch inputs of storage registers 39 and 41 so as to activate registers 39 and 41 such that the sixteen-bit parallel data word stored within registers 39 and 41 is transferred to the data outputs of registers 39 and 41. The aforesaid sixteen-bit parallel data word is then supplied to computer 19 for processing thereby.

The trailing edge of pulse 78 of the signal of FIG. 3S, when applied to the clock input of shift register 29, triggers shift register 29 such that the Q1 output thereof will change from a logic "1" state to a logic "0" state as shown in FIG. 3T, and the Q2 output thereof will change from a logic "0" state to a logic "1" state, as shown in the signal waveform of FIG. 3U. The logic "1" provided at the Q2 output of shift register 29 is supplied to the latch inputs of storage registers 43 and 45 so as to activate registers 43 and 45 such that the sixteen-bit parallel data word stored within registers 43 and 45 is transferred to the data outputs of registers 43 and 45. The aforesaid sixteen-bit parallel data word is then supplied to computer 19 for processing thereby.

The trailing edge of pulse 80 of the signal of FIG. 3S, when applied to the clock input of shift register 29, triggers shift register 29 such that the Q2 output thereof will change from the logic "1" state to a logic "0" state as shown in FIG. 3U, and the $\overline{Q3}$ output thereof will change from the logic "1" state to a logic "0" state, as shown in the signal waveform of FIG. 3V. The change from the logic "1" state to the logic "0" state of the signal of FIG. 3V, in turn, triggers one-shot multivibrator 53 such that the one-shot multivibrator 53 will provide at the output thereof a pulse 82 similar to that shown in the signal waveform of FIG. 3W. The aforementioned pulse 82 is then inverted by NOR gate 27, as shown in the signal waveform of FIG. 3X, and supplied to the reset inputs of shift registers 29 and 31, flip-flop 33, and storage registers 35, 37, 39, 41, 43, 45. Pulse 82, of FIG. 3X, in turn, resets shift register 31 such that the Q0, Q1 and Q2 outputs thereof change from the logic "1" state to a logic "0" as shown, respectively, in the signals of FIGS. 3C, 3E, and 3G. In addition, pulse 82 of FIG. 3X resets shift register 29 such that the $\overline{Q3}$ output thereof changes to a logic "1" as shown in the signal waveform of FIG. 3V. Further, pulse 82 of FIG. 3X resets flip-flop 33 such that Q output thereof changes from a logic "1" state to a logic "0" state, thereby activating the parallel entry input of shift register 29. Pulse 82 of FIG. 3X also clears storage registers 35 through 45 such that additional sixteen-bit data words may be stored therein, and causes the interrupt output of storage register 45 to change from a logic "0" to a logic "1" state as shown in the signal of FIG. 3I.

In addition, it should be noted at this time that the Q0, Q1, and Q2 outputs of shift register 29 are combined by NOR gate 57 as shown by the signal waveform of FIG. 3M, which as discussed above depicts the output of NOR gate 57. The signal of FIG. 3M is then supplied to NOR gate 69 so as to open NOR gate 69 such that pulses 76 and 78 will pass therethrough to the output thereof as shown in the signal waveform of FIG. 3N. The signal of FIG. 3N is, in turn, inverted by NOR gate 71, as shown in FIG. 3O, and supplied through output terminal 73 to the data ready input of computer 19. As discussed previously, the first logic "1" to logic "0" transition of the pulse signal of FIG. 3O indicates to computer 19 that a sixteen-bit data word is ready to be transferred from registers 35 and 37 to computer 19. In a like manner, the second logic "1" to logic "0" transition of the pulse signal of FIG. 3O indicates to computer 19 that a sixteen-bit data word is ready to be transferred from registers 39 and 41 to computer 19. Likewise, the third logic "1" to logic "0" transition of the pulse signal of FIG. 3O indicates to computer 19 that a sixteen-bit data word is ready to be transferred from registers 43 and 45 to computer 19.

From the foregoing, it may readily be seen that the subject invention comprises a new, unique, and exceedingly useful data buffer circuit which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:
1. A data storage circuit comprising, in combination:
   a first input terminal to receive a data ready pulse signal;
   first gating means having a first input effectively connected to said first input terminal, a second input, and first, second, and third outputs, for providing, in response to said data ready pulse signal, a first latch signal, a second latch signal, and a third latch signal;
   a second input terminal to receive a data acknowledge pulse signal;
   a third input terminal;
   second gating means having a first input effectively connected to said second input terminal, a second input, a third input effectively connected to said third input terminal, a first output connected to the second input of said first gating means, and second, third, fourth, and fifth outputs, for providing, in response to said data acknowledge pulse signal, a first select signal, a second select signal, and a third select signal;
   first storage means having a latch input connected to the first output of said first gating means, a select input connected to the second output of said second gating means, a reset input connected to the first output of said second gating means, a plurality of data inputs, and a plurality of data outputs, adapted for receiving at the data inputs thereof a first data word, for storing therein for a first predetermined time period, in response to said first latch signal, said first data word, and for transferring to the data outputs thereof, in response to said first select signal, said first data word;
   second storage means having a latch input connected to the second output of said first gating means, a select input connected to the third output of said second gating means, a reset input connected to the first output of said second gating means, a plurality of data inputs, and a plurality of data outputs, for receiving at the data inputs thereof a second data word, for storing therein for a second predetermined time period, in response to said second latch signal, said second data word, and for transferring to the data outputs thereof, in response to said second select signal, said second data word; and
   third storage means having a latch input connected to the third output of said first gating means, a select input connected to the fourth output of said second gating means, a reset input connected to the first output of said second gating means, an interrupt output connected to the second input of said second gating means, a plurality of data inputs, and a plurality of data outputs, for receiving at the data inputs thereof a third data word, for storing therein for a third predetermined time period, in response to said third latch signal, said third data word, and for transferring to the data outputs thereof, in response to said third select signal, said third data word.

2. The data storage circuit of claim 1 wherein said first gating means comprises:
   a shift register having a clock input connected to said first input terminal, a reset input connected to the first output of said second gating means, a data input, a $\overline{Q3}$ output connected to the data input thereof, a Q0 output, a Q1 output, and a Q2 output;
   a first NOR gate having first and second inputs connected to the Q0 output of said shift register;
   a second NOR gate having first and second inputs connected to the Q1 output of said shift register; and
   a third NOR gate having first and second inputs connected to the Q2 output of said shift register.

3. The data storage of claim 1 wherein said second gating means comprises:
   a first NOR gate having first and second inputs connected to said second input terminal, and an output;
   a second NOR gate having a first input connected to the output of said first NOR gate, a second input, and an output;
   a ground;
   a shift register having a clock input connected to the output of said second NOR gate, a parallel data input, a parallel entry input, a reset input, a serial data input connected to said ground, and Q0, Q1, Q2, and $\overline{Q3}$ outputs;

a first one-shot multivibrator having an input connected to the $\overline{Q3}$ output of said shift register and an output;

a third NOR gate having a first input connected to the output of said first one-shot multivibrator, a second input, and an output connected to the reset input of said shift register;

a direct current voltage source having an output connected to the parallel data input of said shift register;

a flip-flop having a data input connected to the output of said direct current voltage source, a clock input connected to the output of said first NOR gate, a reset input connected to the output of said third NOR gate, and a Q output connected to the parallel entry input of said shift register;

a second one-shot multivibrator having an input connected to the interrupt output of said third storage means and an output connected to the second input of said second NOR gate;

a fourth NOR gate having a pair of inputs connected to said third input terminal, and an output connected to the second input of said third NOR gate;

a fifth NOR gate having first, second, and third inputs respectively connected to the Q0, Q1, and Q2 outputs of said shift register, and an output;

a sixth NOR gate having first and second inputs connected to the output of said fifth NOR gate, a third input connected to the output of said first NOR gate, and an output; and a seventh NOR gate having first and second inputs connected to the output of said sixth NOR gate.

4. The data storage circuit of claim 1 wherein said first, second, and third data words each comprise a sixteen-bit data word.

5. The data storage circuit of claim 1 further characterized by a serial-to-parallel data conversion interface circuit having a plurality of data outputs effectively and respectively connected to the data inputs of said first, second, and third storage means.

6. The data storage circuit of claim 1 further characterized by a microprocessor having a reset output connected to said third input terminal, and a data ready output connected to said first input terminal.

7. The data storage circuit of claim 1 further characterized by a computer having a data ready input connected to the fifth output of said second gating means, a plurality of data inputs, respectively connected to the data outputs of said first, second, and third storage means and a data acknowledge output connected to said second input terminal.

8. A data buffer circuit comprising, in combination:
a first input terminal;
a first NOR gate having first and second inputs connected to said first input terminal, and an output;
a second NOR gate having a first input connected to the output of said first NOR gate, a second input, and an output;
a second input terminal;
a third NOR gate having first and second inputs connected to said second input terminal, and an output;
a fourth NOR gate having a first input connected to the output of said third NOR gate, a second input, and an output;
a direct current voltage source having an output;
a ground;
a first shift register having a clock input connected to the output of said fourth NOR gate, a parallel data input connected to the output of said direct current voltage source, a parallel entry input, a reset input connected to the output of said second NOR gate, a serial data input connected to said ground and Q0, Q1, Q2, and $\overline{Q3}$ outputs;

a first one-shot multivibrator having an input connected to the $\overline{Q3}$ output of said first shift register, and an output connected to the second input of said second NOR gate;

a flip-flop having a data input connected to the output of said direct current voltage source, a clock input connected to the output of said third NOR gate, a Q output connected to the parallel entry input of said first shift register, and a reset input connected to the output of said second NOR gate;

a third input terminal;

a second shift register having a clock input connected to said third input terminal, a data input, a reset input connected to the output of said second NOR gate, and Q0, Q1, Q2 and $\overline{Q3}$ outputs with the $\overline{Q3}$ output thereof connected to the data input thereof;

a fifth NOR gate having first and second inputs connected to the Q2 output of said second shift register, and an output;

a sixth NOR gate having first and second inputs connected to the Q1 output of said second shift register, and an output;

a seventh NOR gate having first and second inputs connected to the Q0 output of said second shift register, and an output;

an eighth NOR gate having first, second, and third inputs, the first of which is connected to the Q0 output of said first shift register, the second of which is connected to the Q1 output of said first shift register, and the third of which is connected to the Q2 output of said first shift register, and an output;

a ninth NOR gate having first and second inputs effectively connected to the output of eighth NOR gate, a third input connected to the output of third NOR gate, and an output;

a tenth NOR gate having first and second inputs connected to the output of said ninth NOR gate, and an output;

a first storage register having a latch input connected to the output of said fifth NOR gate, a select input connected to the Q2 output of said first shift register, a reset input connected to the output of said second NOR gate, eight data inputs, an interrupt output, and eight data outputs;

a second storage register having a latch input connected to the output of fifth NOR gate, a select input connected to the Q2 output of said first shift register, a reset input connected to the output of said second NOR gate, eight data inputs, and eight data outputs;

a third storage register having a latch input connected to the output of said sixth NOR gate, a select input connected to the Q1 output of said first shift register, a reset input connected to the output of said second NOR gate, eight data inputs, and eight data outputs;

a fourth storage register having a latch input connected to the output of said sixth NOR gate, a select input connected to the Q1 output of said first shift register, a reset input connected to the output of said second NOR gate, eight data inputs, and eight data outputs;

a fifth storage register having a latch input connected to the output of said seventh NOR gate, a select input connected to the Q0 output of said first shift register, a reset input connected to the output of said second NOR gate, eight data inputs, and eight data outputs;

a sixth storage register having a latch input connected to the output of said seventh NOR gate, a select input connected to the Q0 output of said first shift register, a reset input connected to the output of said second NOR gate, eight data inputs, and eight data outputs; and a first one-shot multivibrator having an input connected to the interrupt output of said first storage register, and an output connected to the second input of said fourth NOR gate.

9. The data buffer circuit of claim 8 wherein said first, second, third, fourth, fifth, and sixth storage registers each comprise an eight-bit latch.

10. The data buffer circuit of claim 8 further characterized by a serial-to-parallel data conversion interface circuit having sixteen data outputs, eight of which are effectively and respectively connected to the data inputs of said first, third and fifth storage registers, and eight of which are effectively and respectively connected to the data inputs of said second, fourth, and sixth storage registers.

11. The data buffer circuit of claim 8 further characterized by a microprocessor having a reset output connected to said first input terminal, and a data ready output connected to said third input terminal.

12. The data buffer circuit of claim 8 further characterized by a computer having sixteen data inputs, eight of which are respectively connected to the data outputs of said first, third, and fifth storage registers and eight of which are respectively connected to the data outputs of said second, fourth, and sixth storage registers, a data ready input connected to the output of said tenth NOR gate, and a data acknowledge output connected to said second input terminal.

* * * * *